United States Patent
Tanaka (10) Patent No.: US 9,764,898 B2
(45) Date of Patent: Sep. 19, 2017

(54) AUTOMATED WAREHOUSE AND OPERATION METHOD FOR SAME

(71) Applicant: Murata Machinery, Ltd., Kyoto-shi, Kyoto (JP)

(72) Inventor: Hiroshi Tanaka, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 14/897,587

(22) PCT Filed: May 19, 2014

(86) PCT No.: PCT/JP2014/063216
§ 371 (c)(1),
(2) Date: Dec. 10, 2015

(87) PCT Pub. No.: WO2014/208217
PCT Pub. Date: Dec. 31, 2014

(65) Prior Publication Data
US 2016/0137414 A1 May 19, 2016

(30) Foreign Application Priority Data
Jun. 28, 2013 (JP) .................. 2013-136864

(51) Int. Cl.
*B65G 1/04* (2006.01)
*B66F 9/07* (2006.01)

(52) U.S. Cl.
CPC .......... *B65G 1/0407* (2013.01); *B66F 9/072* (2013.01)

(58) Field of Classification Search
CPC ....................... B65G 1/0407; B65G 1/0421
See application file for complete search history.

(56) References Cited

U.S. PATENT DOCUMENTS 4,417,838 A * 11/1983 Schultz .................. B65G 1/06
414/277
5,397,211 A * 3/1995 Lloyd .................. B65G 1/0407
104/246

(Continued)

FOREIGN PATENT DOCUMENTS

JP   H4007508 U   1/1992
JP   2001019119 A 1/2001
(Continued)

OTHER PUBLICATIONS

International Search Report (Form PCT/ISA/210) dated Aug. 5, 2014 corresponds to PCT/JP2014/063216.
International Preliminary Report of Patentability (PCT/IB/338) dated Dec. 30, 2015 corresponds to PCT/JP2014/063216.
Extended European Search Report dated Jan. 31, 2017 (Jan. 31, 2017) issued in corresponding European Patent Application No. EP 14181090.4 (EP 14 81 8090) cites the foreign document above.

*Primary Examiner* — Kaitlin Joerger
(74) *Attorney, Agent, or Firm* — DLA PIPER LLP (US)

(57) ABSTRACT

An automated warehouse includes: a plurality of shelves each configured to accommodate an article; a loading-and-unloading port where the article is loaded and unloaded; a stacker crane configured to convey the article between the shelves and the loading-and-unloading port; and a traveling path on which the stacker crane travels. The stacker crane includes a traveling unit including a traveling drive wheel configured to roll along the traveling path, a mast vertically provided on the traveling unit so as to overlap the traveling drive wheel when viewed from a vertical direction, and a lifting platform arranged on one side in a travel direction with respect to the mast and configured to ascend and descend along the mast.

15 Claims, 7 Drawing Sheets

(56) References Cited

U.S. PATENT DOCUMENTS

| | | | |
|---|---|---|---|
| 7,575,407 B2* | 8/2009 | Tsujimoto | B65G 1/0407 414/279 |
| 7,686,559 B2* | 3/2010 | Tsujimoto | B65G 1/0407 414/273 |
| 7,693,600 B2* | 4/2010 | Tsujimoto | B65G 43/00 700/213 |
| 7,787,985 B2* | 8/2010 | Tsujimoto | B65G 1/06 414/273 |
| 7,959,396 B2* | 6/2011 | Izumi | B65G 1/0421 414/273 |
| 9,221,604 B2* | 12/2015 | Takagawa | B65G 1/0421 |
| 2003/0098207 A1 | 5/2003 | Tai | |
| 2007/0032903 A1 | 2/2007 | Tsujimoto | |
| 2008/0053754 A1 | 3/2008 | Izumi | |

FOREIGN PATENT DOCUMENTS

| | | |
|---|---|---|
| JP | 2003226406 A | 8/2003 |
| JP | 2004091136 A | 3/2004 |
| JP | 2004277167 A | 10/2004 |
| JP | 2007008705 A | 1/2007 |
| JP | 2007015780 A | 1/2007 |
| JP | 2008056365 A | 3/2008 |
| JP | 2010143757 A | 7/2010 |
| WO | 2012032200 A1 | 3/2012 |

* cited by examiner

*Fig.7*

AUTOMATED WAREHOUSE AND OPERATION METHOD FOR SAME

CROSS REFERENCE TO RELATED APPLICATIONS

This application is a national stage of international application no. PCT/JP2014/063216 filed on May 19, 2014, and claims the benefit of priority under 35 USC 119 of Japanese application no. 2013-136864, filed on Jun. 28, 2013, which are incorporated herein by reference.

TECHNICAL FIELD

The present invention relates to an automated warehouse for storing articles and an operation method for the same.

BACKGROUND ART

As an automated warehouse as described above, an automated warehouse including a stacker crane configured to convey articles has been known (see Patent Literature 1, for example). In such an automated warehouse, a stacker crane travels along a plurality of shelves and conveys articles between a loading-and-unloading port and the shelves.

CITATION LIST

Patent Literature

[Patent Literature 1] Japanese Patent Application Laid-Open Publication No. 2010-143757

SUMMARY OF INVENTION

Technical Problem

In an automated warehouse as described above, because dead space is required to be as small as possible, development of a technique that enables reduction in its installation area has been desired.

The present invention has been made to solve such a problem, and aims to provide an automated warehouse that enables reduction in its installation area and an operation method therefor.

Solution to Problem

An automated warehouse according to one aspect of the present invention includes: a plurality of shelves each configured to accommodate an article; a loading-and-unloading port where the article is loaded and unloaded; a first stacker crane configured to convey the article between the shelves and the loading-and-unloading port; and a traveling path on which the first stacker crane travels. The first stacker crane includes a first traveling unit including a first traveling drive wheel configured to roll along the traveling path, a first mast vertically provided on the first traveling unit so as to overlap the first traveling drive wheel when viewed from a vertical direction, a first lifting platform arranged on one side in a travel direction with respect to the first mast and configured to ascend and descend along the first mast, and a first transferring device provided to the first lifting platform.

In the automated warehouse according to the one aspect of the present invention, because the first lifting platform of the first stacker crane is arranged on one side in the travel direction with respect to the first mast, when an article is transferred onto a shelf at the end on the other side in the travel direction, the first mast juts out from the shelf to the other side in the travel direction. Accordingly, an area for retracting the first mast needs to be provided in the automated warehouse. In the automated warehouse according to the one aspect of the present invention, the first traveling drive wheel and the first mast are provided so as to overlap when viewed from the vertical direction. Consequently, when an article is transferred onto a shelf at the end on the other side in the travel direction, a portion jutting out from the shelf other than the first mast in the first stacker crane is reduced, whereby a useless area can be reduced. Thus, the installation area can be reduced.

The first traveling unit may include a first guide wheel arranged on the one side in the travel direction with respect to the first traveling drive wheel and configured to roll along the traveling path and a first supporting unit arranged on the one side in the travel direction with respect to the first traveling drive wheel and supporting the first guide wheel. The first supporting unit may have a space that at least part of the first lifting platform is allowed to enter. With this configuration, the first guide wheel and the first supporting unit are arranged on the same side as the first lifting platform with respect to the first mast. Consequently, when an article is transferred onto a shelf at the end on the other side in the travel direction, a portion jutting out from the shelf other than the first mast in the first stacker crane is reduced, whereby a useless area can be reduced. Thus, the installation area can be reduced. Furthermore, because at least part of the first lifting platform can enter the space that the first supporting unit has, the first lifting platform can be lowered down to a relatively low position. Thus, for example, it is possible to increase the number of shelves or to arrange a shelf in a lower position.

The automated warehouse may further include an auxiliary path provided above the traveling path so as to oppose the traveling path and configured to assist traveling of the first stacker crane. The first stacker crane may further include a first auxiliary traveling unit attached to an upper portion of the first mast and including a first auxiliary drive wheel configured to roll along the auxiliary path. With this configuration, the first traveling drive wheel and the first auxiliary drive wheel are driven in a synchronized manner, whereby the attitude of the first mast can be stabilized.

The automated warehouse may further include a second stacker crane arranged on the one side in the travel direction with respect to the first stacker crane and configured to convey the article between the shelves and the loading-and-unloading port. The second stacker crane may include a second traveling unit including a second traveling drive wheel configured to roll along the traveling path, a second mast vertically provided on the second traveling unit so as to overlap the second traveling drive wheel when viewed from the vertical direction, a second lifting platform arranged on the other side in the travel direction with respect to the second mast and configured to ascend and descend along the second mast, and a second transferring device provided to the second lifting platform. With this configuration, articles can be conveyed by both the first stacker crane and the second stacker crane, and thus a plurality of articles can be quickly conveyed. Furthermore, in the automated warehouse according to the one aspect of the present invention, because the second lifting platform of the second stacker crane is arranged on the other side in the travel direction with respect to the second mast, when an article is transferred onto a shelf at the end on the one side in the travel direction, the second mast juts out from the shelf to the one side in the travel direction. Accordingly, an area for retracting the second mast needs to be provided in the automated warehouse. In the automated warehouse according to the one aspect of the present invention, the second traveling drive wheel and the second mast are provided so as to overlap when viewed from the vertical direction. Consequently, when an article is transferred onto a shelf at the end on the one side in the travel direction, a portion jutting out from the shelf other than the second mast in the second stacker crane can be reduced, whereby a useless area can be reduced. Thus, the installation area can be reduced.

An operation method for an automated warehouse according to one aspect of the present invention is an operation method for the above-described automated warehouse, and includes: a first step of disposing the first transferring device and the second transferring device at different positions in the vertical direction; and a second step of, after the first step, disposing the first stacker crane and the second stacker crane so that the first transferring device and the second transferring device face shelves at a same position in the horizontal direction.

In the operation method for an automated warehouse according to the one aspect of the present invention, articles can be transferred onto two shelves at the same position in the horizontal direction. Thus, a plurality of articles can be quickly conveyed.

An operation method for an automated warehouse according to one aspect of the present invention is an operation method for the above-described automated warehouse, and includes: when the first stacker crane has failed, a first step of disposing the first stacker crane so that the first transferring device faces the shelf at the end on the other side in the travel direction; and a second step of causing the second stacker crane to convey the article.

In the operation method for an automated warehouse according to the one aspect of the present invention, if the first stacker crane has failed, the first stacker crane is disposed so that the first transferring device faces the shelf at the end on the other side in the travel direction. If the first stacker crane has failed, when the first stacker crane is disposed at a predetermined position in the traveling path to be retracted, the first stacker crane may block a shelf, so that the second stacker crane may be unable to transfer an article onto the shelf blocked by the first stacker crane. Furthermore, in order to surely prevent the interference between the first stacker crane and the second stacker crane, the second stacker crane may be unable to transfer an article onto a shelf around the shelf blocked by the first stacker crane. In the operation method for an automated warehouse according to the one aspect of the present invention, because the first stacker crane is disposed so that the first transferring device faces the shelf at the end on the other side in the travel direction, there is no shelf onto which the second stacker crane cannot transfer an article, on the other side in the travel direction with respect to the first transferring device. Thus, it is possible to continue conveyance of articles with the second stacker crane while reducing the number of shelves onto or from which the second stacker crane cannot transfer articles due to obstruction by the first stacker crane.

In the second step, restraint of the first lifting platform on the first mast may be released in the first stacker crane. With this configuration, when an article is desired to be transferred onto or from a shelf unavailable for transferring the article from or onto the second transferring device due to obstruction by the first stacker crane, the article can be transferred by moving the first lifting platform.

Advantageous Effects of Invention

According to the present invention, it is possible to provide an automated warehouse that enables reduction in its installation area and an operation method therefor.

DESCRIPTION OF EMBODIMENTS

Embodiments will be described hereinafter in detail with reference to the drawings. Herein, like reference signs are given to like or equivalent elements and duplicated explanation is omitted.

Figure 1:
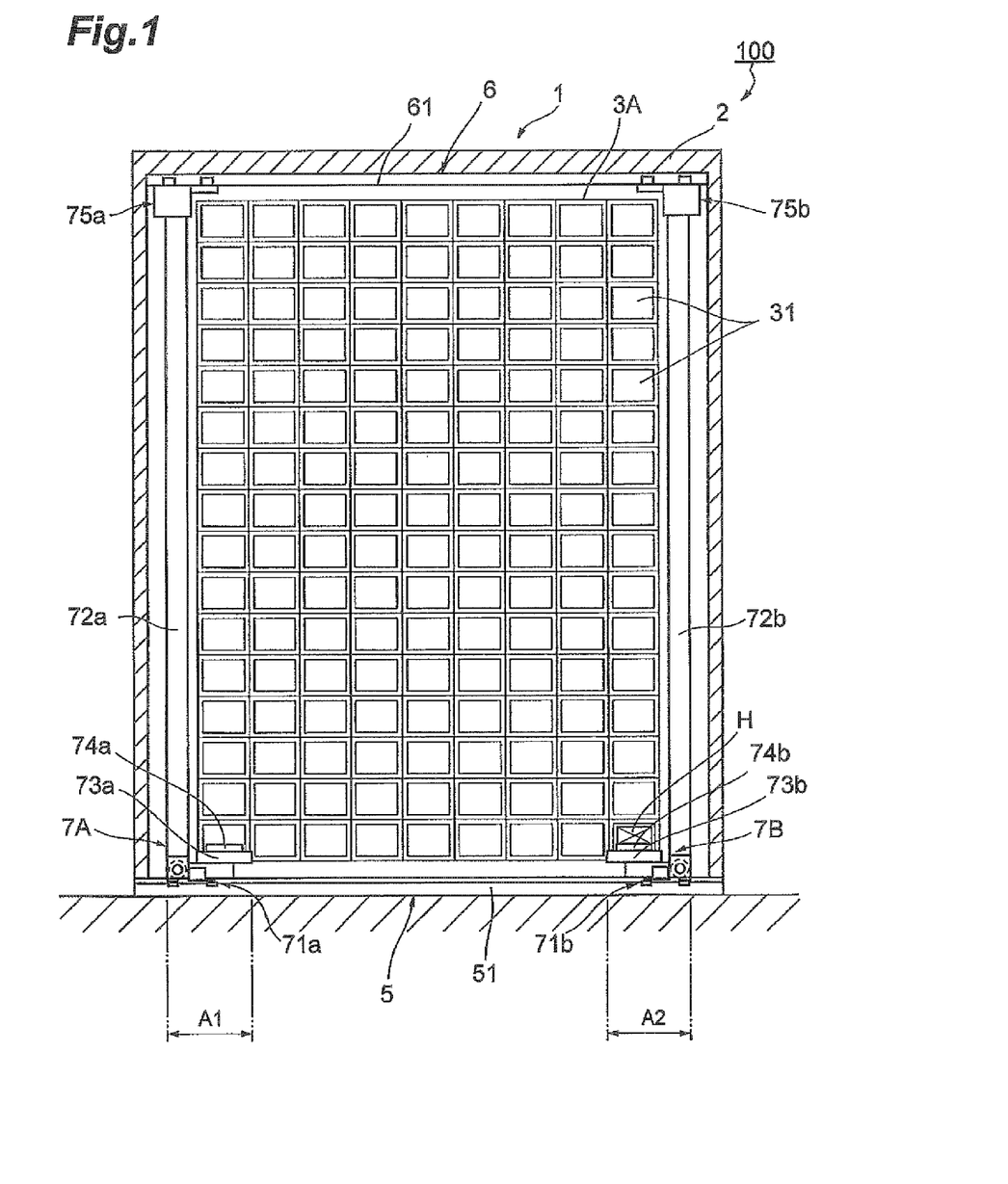
FIG. 1 is a front view of an automated warehouse according to one embodiment of the present invention.
Figure 2:
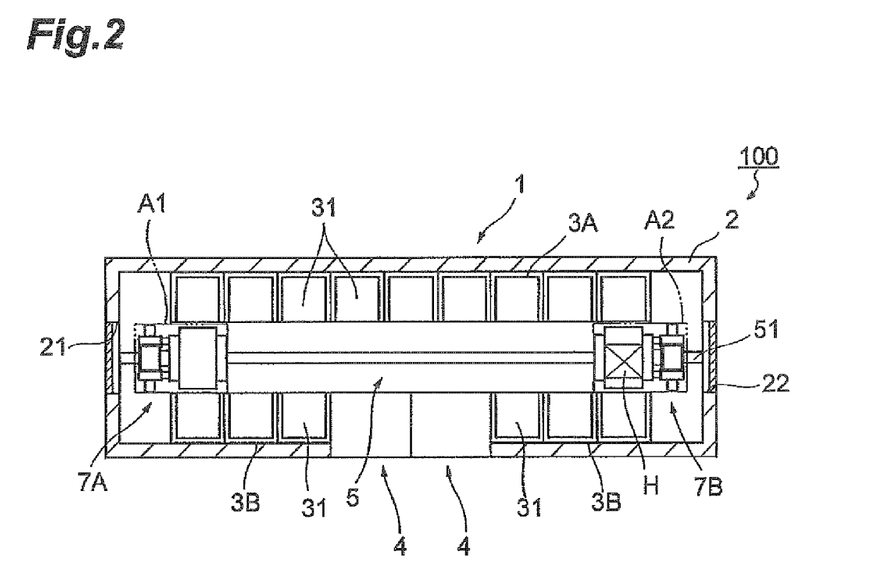
FIG. 2 is a plan view of the automated warehouse in FIG. 1.

As depicted in FIGS. 1 and 2, an automated warehouse 1 is provided in a building 100. The automated warehouse 1 stores therein articles H conveyed by, for example, a conveyance device.

The automated warehouse 1 includes a stocker body 2, racks 3A and 3B, loading-and-unloading ports 4 and 4, a traveling path 5, an auxiliary path 6, and a stacker crane (first stacker crane) 7A and a stacker crane (second stacker crane) 7B.

The stocker body 2 has a shape of a case surrounding a certain space (e.g., shape of a hollow cuboid). The stocker body 2 has a first opening 21 and a second opening 22 through which the stacker crane 7A and the stacker crane 7B can be taken out of the stocker body 2. The first opening 21 and the second opening 22 are formed so as to oppose each other in the horizontal direction. The first opening 21 and the second opening 22 each are provided with a door.

The racks 3A and 3B each are installed upright in the stocker body 2. The rack 3A and the racks 3B are provided so as to oppose each other. The rack 3A is provided along a side wall on one side (upper side in FIG. 2) out of two side walls opposing each other in the stocker body 2. The rack 3A is provided at a portion of the side wall on the one side except both end portions in the horizontal direction. Each rack 3B is provided along the side wall on the other side out of the two side walls opposing each other in the stocker body 2. The racks 3B and 3B are provided at a portion of the side wall on the other side except both end portions and a central portion in the horizontal direction. At the central portion in the horizontal direction on the side wall on the other side, the loading-and-unloading ports 4 and 4 are formed. At both sides of the loading-and-unloading ports 4 and 4, the respective racks 3B are provided. At each loading-and-unloading port 4, loading and unloading of articles H into or from the automated warehouse 1 are performed.

The racks 3A and 3B each are provided with a plurality of shelves 31 each configured to accommodate an article H. The shelves 31 are provided in a plurality of rows along the horizontal direction, and also provided in a plurality of levels along the vertical direction.

The traveling path 5 and the auxiliary path 6 each are provided between the first opening 21 and the second opening 22 in the stocker body 2. The traveling path 5 is provided on a floor along a plurality of rows of the shelves 31. On the traveling path 5, a traveling rail 51 is laid. The auxiliary path 6 is provided substantially right above the traveling path 5 along the rows of the shelves 31 so as to oppose the traveling path 5. On the auxiliary path 6, an auxiliary rail 61 is laid.

The stacker crane 7A and the stacker crane 7B each travel on the traveling path 5 to convey an article H between a shelf 31 and a loading-and-unloading port 4, and transfer the article H onto or from the shelf 31 (perform loading and unloading). The stacker crane 7B is disposed on one side in the travel direction along the traveling path 5 and the auxiliary path 6 with respect to the stacker crane 7A (on the right side in FIGS. 1 and 2, on the second opening 22 side with respect to stacker crane 7A).

In the stocker body 2, an area A1 is provided into which the stacker crane 7A is disposed when the stacker crane 7A transfers an article H onto a shelf 31 on a row at the end on the other side in the travel direction. In the area A1, a transferring device (first transferring device) 74a (described later) of the stacker crane 7A faces the shelf 31 on the row at the end on the other side in the travel direction. The area A1 includes an area into which a mast (first mast) 72a (described later) of the stacker crane 7A is retracted.

In the stocker body 2, an area A2 is provided into which the stacker crane 7B is disposed when the stacker crane 7B transfers an article H onto a shelf 31 on a row at the end on the one side in the travel direction. In the area A2, a transferring device (second transferring device) 74b (described later) of the stacker crane 7B faces the shelf 31 on the row at the end on the one side in the travel direction. The area A2 includes an area into which a mast (second mast) 72b (described later) of the stacker crane 7B is retracted.

Figure 3:
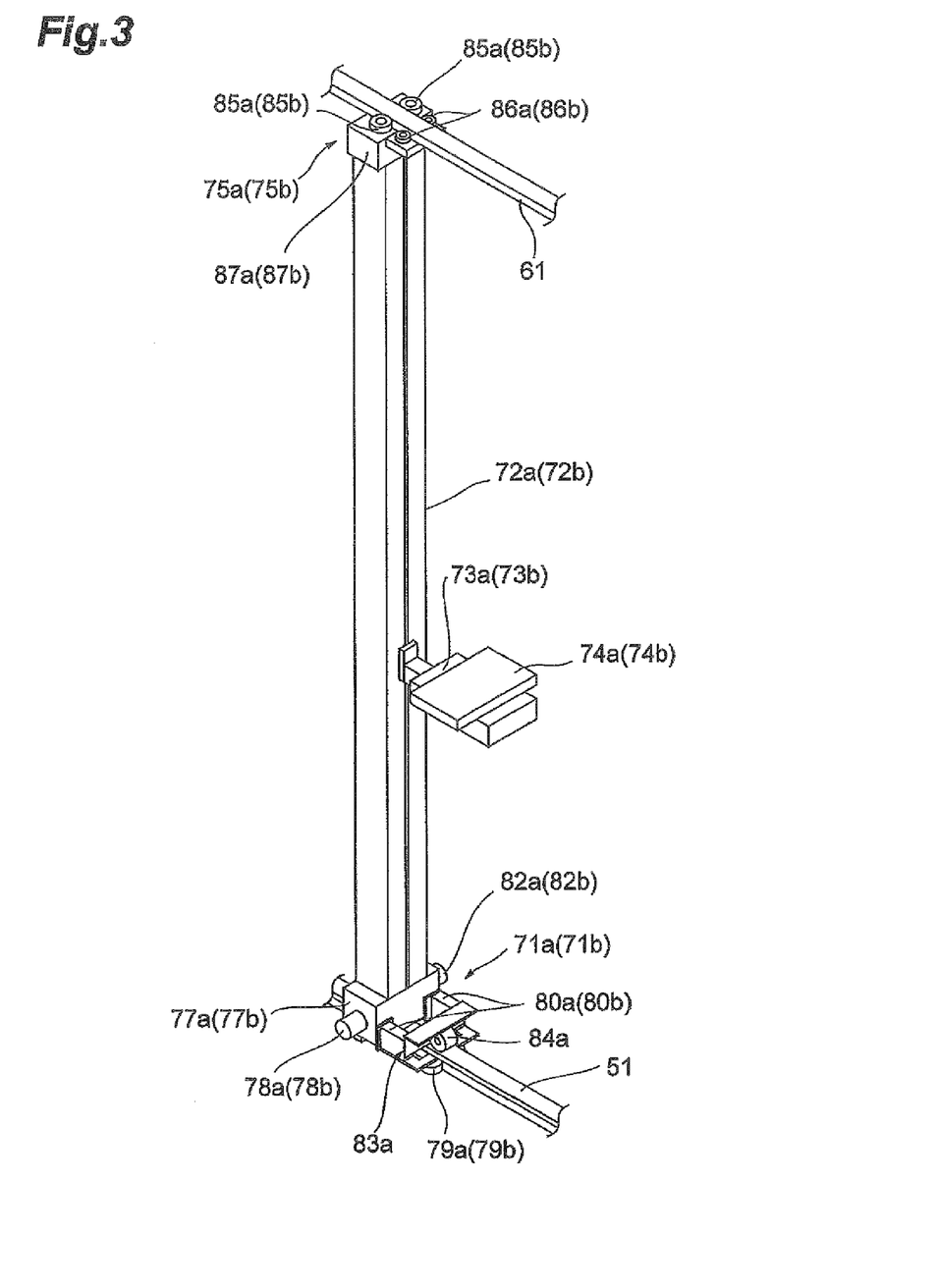
FIG. 3 is a perspective view of a stacker crane in FIG. 1.

As depicted in FIG. 3, the stacker crane 7A includes a traveling unit (first traveling unit) 71a, the mast 72a, a lifting platform (first lifting platform) 73a, the transferring device 74a, and an auxiliary traveling unit (first auxiliary traveling unit) 75a.

The traveling unit 71a travels along the traveling path 5. The mast 72a is vertically provided on the traveling unit 71a. The lifting platform 73a is arranged so as to protrude from the mast 72a in the travel direction, and ascends and descends along the mast 72a. The transferring device 74a is provided to an upper portion of the lifting platform 73a. The transferring device 74a transfers an article H onto or from shelves 31, and also transfers the article H onto or from each loading-and-unloading port 4. The auxiliary traveling unit 75a travels along the auxiliary path 6.

Figure 4:
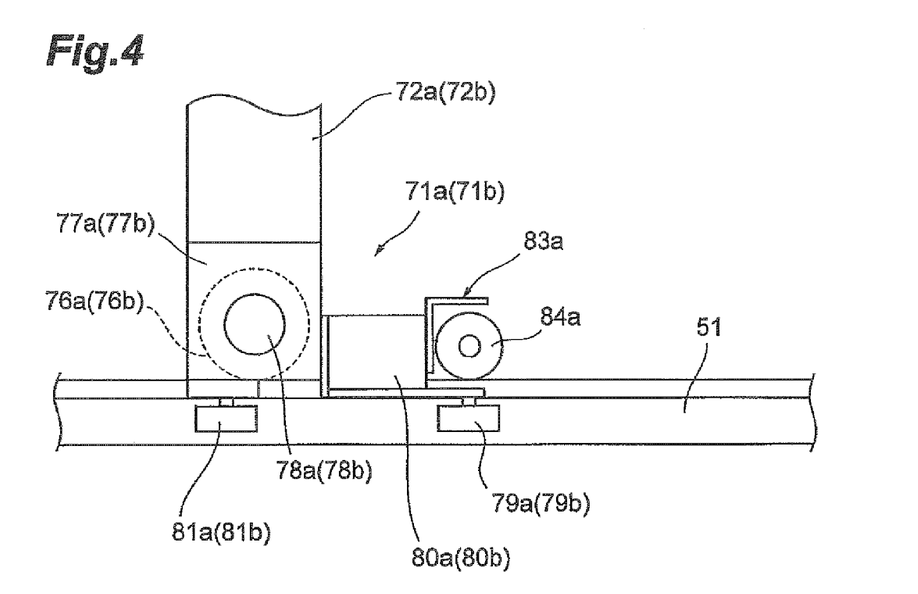
FIG. 4 is a front view of a lower portion of the stacker crane in FIG. 3.
Figure 5:
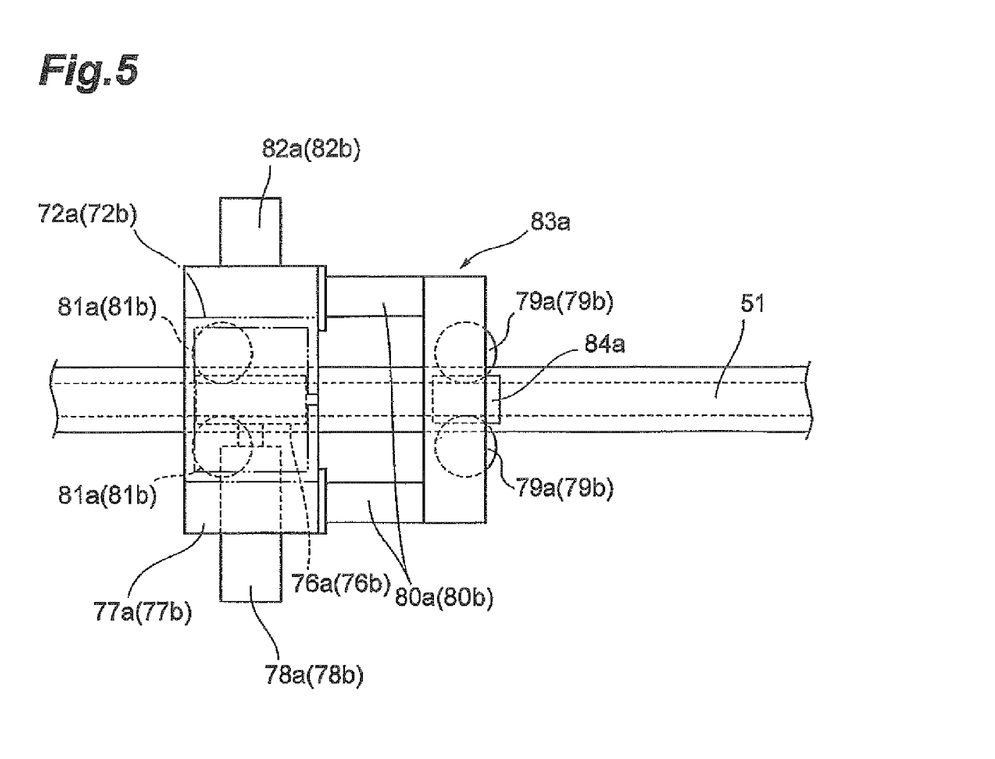
FIG. 5 is a plan view of the lower portion of the stacker crane in FIG. 3.

The following describes the traveling unit 71a in detail. As depicted in FIGS. 4 and 5, the traveling unit 71a includes a traveling drive wheel (first traveling drive wheel) 76a, a housing 77a, a traveling motor 78a, a pair of lifting-platform-side traveling guide wheels (first guide wheels) 79a and 79a, a supporting unit (first supporting unit) 80a, and a pair of mast-side traveling guide wheels 81a and 81a.

The traveling drive wheel 76a rolls along the upper surface of the traveling rail 51. The traveling drive wheel 76a is arranged so as to overlap the mast 72a when viewed from the vertical direction. The housing 77a rotatably supports the traveling drive wheel 76a. The housing 77a is fixed to the lower end of the mast 72a.

The traveling motor 78a is fixed to the housing 77a so as to protrude on the side of shelves 31 of the racks 3B. The traveling motor 78a is a driving source of the traveling drive wheel 76a. Herein, to the housing 77a, a lifting motor 82a that is a driving source of the lifting platform 73a is attached so as to protrude on the side of shelves 31 of the rack 3A.

Each lifting-platform-side traveling guide wheel 79a rolls along a side surface of the traveling rail 51. Each lifting-platform-side traveling guide wheel 79a is arranged on the one side in the travel direction with respect to the traveling drive wheel 76a. The pair of the lifting-platform-side traveling guide wheels 79a and 79a hold the traveling rail 51 in the horizontal direction.

The supporting unit 80a rotatably supports the pair of the lifting-platform-side traveling guide wheels 79a and 79a. The supporting unit 80a is arranged on the one side in the travel direction with respect to the traveling drive wheel 76a. The supporting unit 80a has a pair of portions arranged on both sides with respect to the traveling rail 51, and each of the portions supports each lifting-platform-side traveling guide wheel 79a. The lifting platform 73a can enter a space formed between the pair of the portions of the supporting unit 80a. The pair of the portions of the supporting unit 80a each include a protruded member protruded from the housing 77a and a supporting member protruded from the lower surface of the protruded member and rotatably supporting each lifting-platform-side traveling guide wheel 79a.

Each mast-side traveling guide wheel 81a rolls along a side surface of the traveling rail 51. Each mast-side traveling guide wheel 81a is arranged so as to overlap the mast 72a when viewed from the vertical direction. The pair of the mast-side traveling guide wheels 81a and 81a hold the traveling rail 51 in the horizontal direction. Each mast-side traveling guide wheel 81a is rotatably attached to a lower portion of the housing 77a.

Before the stacker crane 7A is installed on the traveling rail 51, a driven-wheel unit 83a is attached to the traveling unit 71a. The driven-wheel unit 83a is laid over between tips of the pair of the protruded members protruded from the housing 77a in the supporting unit 80a. The driven-wheel unit 83a includes a driven wheel 84a that can roll along the upper surface of the traveling rail 51. The driven-wheel unit 83a is removed from the traveling unit 71a after the stacker crane 7A is installed on the traveling rail 51 (see FIG. 1). Thus, during operation of the stacker crane 7A, the lifting platform 73a can enter the above-described space that the supporting unit 80a has.

Figure 6:
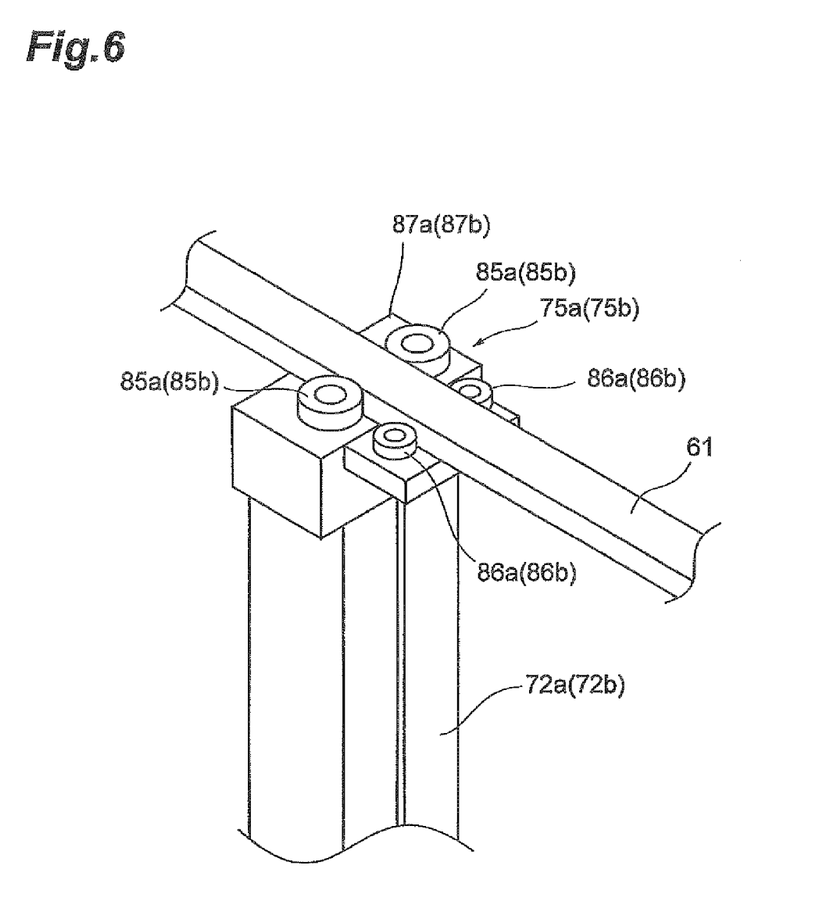
FIG. 6 is a perspective view of an upper portion of the stacker crane in FIG. 3.

The following describes the auxiliary traveling unit 75a in detail. As depicted in FIG. 6, the auxiliary traveling unit 75a includes a pair of auxiliary drive wheels (first auxiliary drive wheels) 85a and 85a, a pair of auxiliary guide wheels 86a and 86a, and a housing 87a.

Each auxiliary drive wheel 85a rolls along the auxiliary rail 61. The pair of the auxiliary drive wheels 85a and 85a hold the auxiliary rail 61 in the horizontal direction. Each auxiliary guide wheel 86a rolls along the auxiliary rail 61. The pair of the auxiliary guide wheels 86a and 86a hold the auxiliary rail 61 in the horizontal direction. The housing 87a is fixed to the upper end of the mast 72a. To the housing 87a, members that rotatably support the auxiliary drive wheels 85a and the auxiliary guide wheels 86a are attached. To the housing 87a, an auxiliary motor (not depicted) that is a driving source of the auxiliary drive wheels 85a is attached.

In the stacker crane 7A, the traveling drive wheel 76a and the auxiliary drive wheels 85a and 85a are driven in a synchronized manner, whereby the attitude of the mast 72*a* is stabilized so that the mast 72*a* is kept substantially upright even when the above-described driven-wheel unit 83*a* is removed.

The stacker crane 7B has a configuration similar to that of the stacker crane 7A, and includes a traveling unit (second traveling unit) 71*b*, a mast 72*b*, a lifting platform (second lifting platform) 73*b*, a transferring device 74*b*, an auxiliary traveling unit 75*b*, and a lifting motor 82*b*. The traveling unit 71*b* has a configuration similar to that of the traveling unit 71*a*, and includes a traveling drive wheel (second traveling drive wheel) 76*b*, a housing 77*b*, a traveling motor 78*b*, a pair of lifting-platform-side traveling guide wheels 79*b* and 79*b*, a supporting unit 80*b*, and a pair of mast-side traveling guide wheels 81*b* and 81*b*. The auxiliary traveling unit 75*b* has a configuration similar to that of the auxiliary traveling unit 75*a*, and includes a pair of auxiliary drive wheels 85*b* and 85*b*, a pair of auxiliary guide wheels 86*b* and 86*b*, and a housing 87*b*.

As depicted in FIGS. 1 and 2, in the stacker crane 7A, the lifting platform 73*a* protrudes on the one side (the stacker crane 7B side) in the travel direction with respect to the mast 72*a*. In the stacker crane 7B, the lifting platform 73*b* protrudes on the other side (the stacker crane 7A side) in the travel direction with respect to the mast 72*b*. With these configurations, the transferring device 74*a* of the stacker crane 7A and the transferring device 74*b* of the stacker crane 7B can respectively face shelves 31 and 31 that are in the same position (row) in the horizontal direction by being disposed in different positions in the vertical direction.

In the above-described automated warehouse 1, the stacker crane 7A and the stacker crane 7B travel along the traveling path 5, convey articles H between shelves 31 and the loading-and-unloading ports 4, and transfer the articles H onto or from the shelves 31 and the loading-and-unloading ports 4.

In this case, when articles H are transferred onto or from two shelves 31 and 31 that are in the same position (same row) in the horizontal direction, the transferring device 74*a* of the stacker crane 7A and the transferring device 74*b* of the stacker crane 7B are disposed first in different positions in the vertical direction. Subsequently, the stacker crane 7A and the stacker crane 7B are disposed so that the transferring device 74*a* of the stacker crane 7A and the transferring device 74*b* of the stacker crane 7B respectively face the shelves 31 and 31 that are in the same position in the horizontal direction.

Subsequently, the articles H are transferred onto or from the shelves 31 that respectively face the stacker crane 7A and the stacker crane 7B. Herein, the article H may be transferred onto only either one of the stacker crane 7A and the stacker crane 7B.

Figure 7:
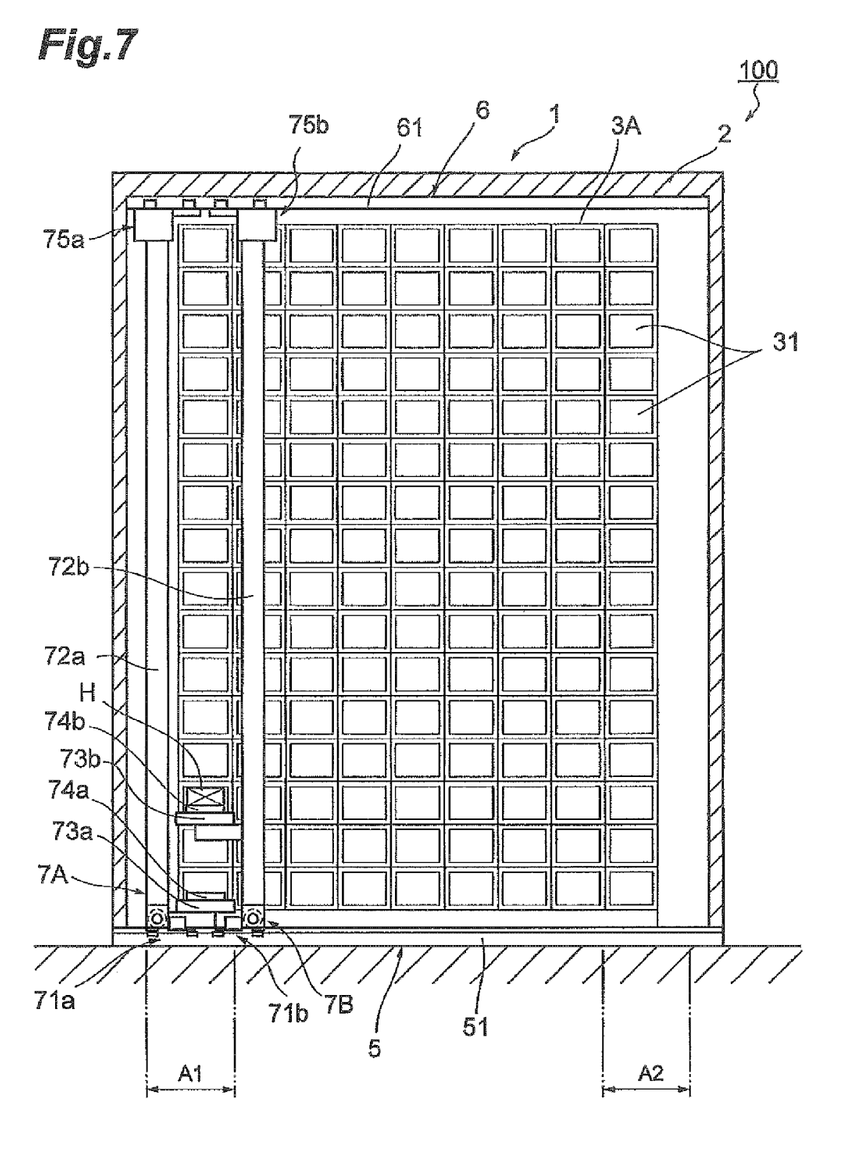
FIG. 7 is a front view illustrating one example of an operation method for the automated warehouse in FIG. 1.

If the stacker crane 7A has failed, for example, conveyance of articles H is continued by the stacker crane 7B. In this case, as depicted in FIG. 7, the stacker crane 7A is disposed into the area A1 first. At this time, in the stacker crane 7A, restraint of the lifting platform 73*a* on the mast 72*a* is released and the lifting platform 73*a* is disposed in the lowermost position. In this state, shelves 31 that the transferring device 74*b* of the stacker crane 7B cannot face (i.e., shelve 31 onto which stacker crane 7B cannot transfer an article H) are three shelves 31 that are a shelf 31 at the lowermost level and a shelf 31 at a level next to the lowermost level in the row at the end on the other side and a shelf 31 at the lowermost level in the row next to the row at the end on the other side. Subsequently, the stacker crane 7B is caused to convey articles H. Herein, retraction of the stacker crane 7A may be performed by the driving force of the driving source or may be performed by man power of an operator.

When an article H is transferred onto a shelve 31 other than the shelf 31 at the lowermost level or the shelf 31 at the level next to the lowermost level out of the shelves 31 in the row at the end on the other side, the transferring device 74*b* of the stacker crane 7B is disposed at the height of a desired shelf 31, and the stacker crane 7B is moved so that the transferring device 74*b* faces the desired shelf 31.

When an article H is transferred onto or from any one of the shelf 31 at the lowermost level and the shelf 31 at the level next to the lowermost level in the row at the end on the other side and the shelf 31 at the lowermost level in the row next to the row at the end on the other side, the operator causes the lifting platform 73*a* of the stacker crane 7A to move to a position higher than the level next to the lowermost level, and causes the stacker crane 7B to move so that the transferring device 74*b* faces the desired shelf 31.

When the stacker crane 7A retracted into the area A1 is repaired while conveyance of articles H is being continued by the stacker crane 7B, a fence, for example, that covers the retracted stacker crane 7A and the surroundings may be placed to secure the safety of the operator. In this case, when articles H are conveyed by the stacker crane 7B, stacker crane 7B is moved in such a manner that the stacker crane 7B does not interfere with the fence. Herein, also if the stacker crane 7B has failed, in the same manner as described above, conveyance of articles H can be continued by the stacker crane 7A.

As described above, in the automated warehouse 1 of the present embodiment, because the lifting platform 73*a* of the stacker crane 7A is arranged on the one side in the travel direction with respect to the mast 72*a*, when an article H is transferred onto a shelf 31 at the end on the other side in the travel direction, the mast 72*a* juts out from the shelf 31 to the other side in the travel direction. Accordingly, an area for retracting the mast 72*a* needs to be provided in the automated warehouse 1. In the automated warehouse 1 of the present invention, the traveling drive wheel 76*a* and the mast 72*a* are provided so as to overlap when viewed from the vertical direction. Consequently, when an article H is transferred onto a shelf 31 at the end on the other side in the travel direction, a portion jutting out from the shelf 31 other than the mast 72*a* in the stacker crane 7A is reduced, whereby a useless area can be reduced. Thus, the installation area can be reduced.

The traveling unit 71*a* includes the lifting-platform-side traveling guide wheels 79*a* and 79*a* arranged on the one side in the travel direction with respect to the traveling drive wheel 76*a* and configured to roll along the traveling path 5 and the supporting unit 80*a* arranged on the one side in the travel direction with respect to the traveling drive wheel 76*a* and supporting the lifting-platform-side traveling guide wheels 79*a* and 79*a*. The supporting unit 80*a* has a space that at least part of the lifting platform 73*a* can enter. Accordingly, the lifting-platform-side traveling guide wheels 79*a* and 79*a* and the supporting unit 80*a* are arranged on the same side as the lifting platform 73*a* with respect to the mast 72*a*. Consequently, when an article H is transferred onto a shelf 31 at the end on the other side in the travel direction, a portion jutting out from the shelf 31 is reduced, whereby a useless area can be reduced. Thus, the installation area can be reduced. Furthermore, because at least part of the lifting platform 73*a* can enter the space that the supporting unit 80*a* has, the lifting platform 73*a* can be lowered down to a relatively low position. Thus, it is possible, for example, to increase the number of shelves 31 or to arrange a shelf 31 in a lower position. The same applies to the traveling unit 71b of the stacker crane 7B.

The automated warehouse 1 further includes the auxiliary path 6 provided above the traveling path 5 so as to oppose the traveling path 5 and configured to assist the traveling of the stacker crane 7A. The stacker crane 7A further includes the auxiliary traveling unit 75a attached to the upper portion of the mast 72a and including the auxiliary drive wheel 85a configured to roll along the auxiliary path 6. Consequently, the traveling drive wheel 76a and the auxiliary drive wheels 85a and 85a are driven in a synchronized manner, whereby the attitude of the mast 72a can be stabilized. The same applies to the stacker crane 7B.

The automated warehouse 1 further includes the stacker crane 7B arranged on the one side in the travel direction with respect to the stacker crane 7A and configured to convey the articles H between shelves 31 and the loading-and-unloading ports 4. The stacker crane 7B includes the traveling unit 71b including the traveling drive wheel 76b configured to roll along the traveling path 5, the mast 72b that is vertically provided on the traveling unit 71b so as to overlap the traveling drive wheel 76b when viewed from the vertical direction, the lifting platform 73b arranged on the other side in the travel direction with respect to the mast 72b and configured to ascend and descend along the mast 72b, and the transferring device 74b provided to the lifting platform 73b. This enables an article H to be conveyed by both the stacker crane 7A and the stacker crane 7B, and thus a plurality of articles H can be quickly conveyed.

In the automated warehouse 1, because the lifting platform 73b of the stacker crane 7B is arranged on the other side in the travel direction with respect to the mast 72b, when an article H is transferred onto a shelf 31 at the end on the one side in the travel direction, the mast 72b juts out from the shelf 31 to the one side in the travel direction. Accordingly, an area for retracting the mast 72b needs to be provided in the automated warehouse 1. In the automated warehouse 1, the traveling drive wheels 76b and the mast 72b are provided so as to overlap when viewed from the vertical direction. Consequently, when an article H is transferred onto a shelf 31 at the end on the one side in the travel direction, a portion jutting out from the shelf 31 other than the mast 72b in the stacker crane 7B is reduced, whereby a useless area can be reduced. Thus, the installation area can be reduced.

An operation method for the automated warehouse 1 of one example of the present embodiment includes: a first step of disposing the transferring device 74a of the stacker crane 7A and the transferring device 74b of the stacker crane 7B at different positions in the vertical direction; and a second step of, after the first step, disposing the stacker crane 7A and the stacker crane 7B so that the transferring device 74a of the stacker crane 7A a and the transferring device 74b of the stacker crane 7B face shelves 31 at the same position in the horizontal direction. In this operation method, articles H can be transferred onto two shelves 31 at the same position in the horizontal direction, thus a plurality of articles H can be quickly conveyed.

An operation method for the automated warehouse 1 of another example of the present embodiment includes, when the stacker crane 7A has failed, a first step of disposing the stacker crane 7A so that the transferring device 74a of the stacker crane 7A faces a shelf 31 at the end on the other side in the travel direction and a second step of causing the stacker crane 7B to convey articles H. In this operation method, if the stacker crane 7A has failed, the stacker crane 7A is disposed so that the transferring device 74a faces the shelf 31 at the end on the other side in the travel direction. If the stacker crane 7A has failed, when the stacker crane is disposed at a predetermined position in the traveling path 5 to be retracted, the stacker crane 7A may block a shelf 31, so that the stacker crane 7B may be unable to transfer an article H onto the shelf 31 blocked by the stacker crane 7A. Furthermore, in order to surely prevent the interference between the stacker crane 7A and the stacker crane 7B, the stacker crane 7B may be unable to transfer an article H onto a shelf 31 around the shelf 31 blocked by the stacker crane 7A. In this operation method, because the stacker crane 7A is disposed so that the transferring device 74a faces the shelf 31 at the end on the other side in the travel direction, there is no shelf 31 onto which the stacker crane 7B cannot transfer an article H, on the other side in the travel direction with respect to the transferring device 74a. Thus, it is possible to continue conveyance of articles H with the stacker crane 7B while reducing the number of shelves 31 onto or from which the stacker crane 7B cannot transfer articles H due to obstruction by the stacker crane 7A.

In the second step, restraint of the lifting platform 73a on the mast 72a is released in the stacker crane 7A. Consequently, when an article H is desired to be transferred onto or from a shelf 31 unavailable for transferring the article H from or onto the stacker crane 7B due to obstruction by the stacker crane 7A, the article H can be transferred by moving the lifting platform 73a of the stacker crane 7A by hand.

In the foregoing, embodiments of transferring device of the present invention have been described, but the present invention is not limited to the above-described embodiments. Configurations, numbers, and shapes, for example, of the respective elements are not limited to the configurations, the numbers, and the shapes, for example, in the above-described embodiments, and may be changed as appropriate.

INDUSTRIAL APPLICABILITY

According to the present invention, it is possible to provide an automated warehouse that enables reduction in its installation area and an operation method therefor.

REFERENCE SIGNS LIST

1 . . . automated warehouse, 4 . . . loading-and-unloading port, 5 . . . traveling path, 6 . . . auxiliary path, 7A . . . stacker crane (first stacker crane), 7B . . . stacker crane (second stacker crane), 31 . . . shelf, 71a . . . traveling unit (first traveling unit), 71b . . . traveling unit (second traveling unit), 72a . . . mast (first mast), 72b . . . mast (second mast), 73a . . . lifting platform (first lifting platform), 73b . . . lifting platform (second lifting platform), 74a . . . transferring device (first transferring device), 74b . . . transferring device (second transferring device), 75a . . . auxiliary traveling unit (first auxiliary traveling unit), 76a . . . traveling drive wheel (first traveling drive wheel), 76b . . . traveling drive wheel (second traveling drive wheel), 79a . . . lifting-platform-side traveling guide wheel (first guide wheel), 80a . . . supporting unit (first supporting unit), H . . . article

The invention claimed is:
1. An automated warehouse comprising:
a plurality of shelves each configured to accommodate an article;
a loading-and-unloading port where the article is loaded and unloaded;

a first stacker crane configured to convey the article between the shelves and the loading-and-unloading port; and a traveling path on which the first stacker crane travels, wherein the first stacker crane includes a first traveling unit including a first traveling drive wheel configured to roll along the traveling path, a first mast vertically provided on the first traveling unit so as to overlap the first traveling drive wheel when viewed from a vertical direction, a first lifting platform arranged on one side in a travel direction with respect to the first mast and configured to ascend and descend along the first mast, a first transferring device provided to the first lifting platform, a first traveling motor configured to drive the first traveling drive wheel, and a first lifting motor configured to drive the first lifting platform, the first traveling unit is arranged, in the travel direction, on the one side with respect to an end of the first mast on the other side, opposite sides of the first mast are perpendicular to the vertical direction and the travel direction, the first traveling motor and the first lifting motor are arranged on opposite sides of the first mast, all of the first traveling motor and all of the first lifting motor are within the length of the first mast in the travel direction, the first traveling motor is arranged protruding from the first traveling unit to one side in a direction intersecting an extending direction of the first mast and an extending direction of the traveling path, and the first lifting motor is arranged protruding from the first traveling unit to the other side in the direction intersecting the extending direction of the first mast and the extending direction of the traveling path.

2. The automated warehouse according to claim 1, wherein the first traveling unit includes a first guide wheel arranged on the one side in the travel direction with respect to the first traveling drive wheel and configured to roll along the traveling path, and a first supporting unit arranged on the one side in the travel direction with respect to the first traveling drive wheel and supporting the first guide wheel, and the first supporting unit has a space that at least part of the first lifting platform is allowed to enter.

3. The automated warehouse according to claim 2, further comprising an auxiliary path provided above the traveling path so as to oppose the traveling path and configured to assist traveling of the first stacker crane, wherein the first stacker crane further includes a first auxiliary traveling unit attached to an upper portion of the first mast and including a first auxiliary drive wheel configured to roll along the auxiliary path.

4. The automated warehouse according to claim 1, further comprising a second stacker crane arranged on the one side in the travel direction with respect to the first stacker crane and configured to convey the article between the shelves and the loading-and-unloading port, wherein the second stacker crane includes a second traveling unit including a second traveling drive wheel configured to roll along the traveling path, a second mast vertically provided on the second traveling unit so as to overlap the second traveling drive wheel when viewed from the vertical direction, a second lifting platform arranged on the other side in the travel direction with respect to the second mast and configured to ascend and descend along the second mast, a second transferring device provided to the second lifting platform, a second traveling motor configured to drive the second traveling drive wheel, and a second lifting motor configured to drive the second lifting platform, the second traveling unit is arranged, in the travel direction, on the other side with respect to an end of the second mast on the one side, opposite sides of the second mast are perpendicular to the vertical direction and the travel direction, the second traveling motor and the second lifting motor are arranged on opposite sides of the second mast, all of the second traveling motor and all of the second lifting motor are within the length of the second mast in the travel direction, the second traveling motor is arranged protruding from the second traveling unit to one side in a direction intersecting an extending direction of the second mast and the extending direction of the traveling path, and the second lifting motor is arranged protruding from the second traveling unit to the other side in the intersecting the extending direction of the second mast and the extending direction of the traveling path.

5. An operation method for the automated warehouse according to claim 4, comprising:

a first step of disposing the first transferring device and the second transferring device at different positions in the vertical direction; and a second step of, after the first step, disposing the first stacker crane and the second stacker crane so that the first transferring device and the second transferring device face shelves at a same position in the horizontal direction.

6. An operation method for the automated warehouse according to claim 4, comprising:

when the first stacker crane has failed, a first step of disposing the first stacker crane so that the first transferring device faces the shelf at the end on the other side in the travel direction; and a second step of causing the second stacker crane to convey the article.

7. The operation method for an automated warehouse according to claim 6, wherein, in the second step, restraint of the first lifting platform on the first mast is released in the first stacker crane.

8. The automated warehouse according to claim 2, further comprising a second stacker crane positioned on the one side in the travel direction with respect to the first stacker crane and configured to convey the article between the shelves and the loading-and-unloading port, wherein the second stacker crane includes a second traveling unit including a second traveling drive wheel configured to roll along the traveling path, a second mast vertically provided on the second traveling unit so as to overlap the second traveling drive wheel when viewed from the vertical direction, a second lifting platform arranged on the other side in the travel direction with respect to the second mast and configured to ascend and descend along the second mast, a second transferring device provided to the second lifting platform, a second traveling motor configured to drive the second traveling drive wheel, and a second lifting motor configured to drive the second lifting platform, the second traveling unit, the second traveling motor, and the second lifting motor are arranged, in the travel direction, on the other side with respect to an end of the second mast on the one side, the second traveling motor is arranged protruding from the second traveling unit to one side in a direction intersecting an extending direction of the second mast and the extending direction of the traveling path, and the second lifting motor is arranged protruding from the second traveling unit to the other side in the intersecting the extending direction of the second mast and the extending direction of the traveling path.

9. An operation method for the automated warehouse according to claim 8, comprising:

a first step of disposing the first transferring device and the second transferring device at different positions in the vertical direction; and a second step of, after the first step, disposing the first stacker crane and the second stacker crane so that the first transferring device and the second transferring device face shelves at a same position in the horizontal direction.

10. An operation method for the automated warehouse according to claim 8, comprising:

when the first stacker crane has failed, a first step of disposing the first stacker crane so that the first transferring device faces the shelf at the end on the other side in the travel direction; and a second step of causing the second stacker crane to convey the article.

11. The operation method for an automated warehouse according to claim 10, wherein, in the second step, restraint of the first lifting platform on the first mast is released in the first stacker crane.

12. The automated warehouse according to claim 3, further comprising a second stacker crane positioned on the one side in the travel direction with respect to the first stacker crane and configured to convey the article between the shelves and the loading-and-unloading port, wherein the second stacker crane includes a second traveling unit including a second traveling drive wheel configured to roll along the traveling path, a second mast vertically provided on the second traveling unit so as to overlap the second traveling drive wheel when viewed from the vertical direction, a second lifting platform arranged on the other side in the travel direction with respect to the second mast and configured to ascend and descend along the second mast, a second transferring device provided to the second lifting platform, a second traveling motor configured to drive the second traveling drive wheel, and a second lifting motor configured to drive the second lifting platform, the second traveling unit, the second traveling motor, and the second lifting motor are arranged, in the travel direction, on the other side with respect to an end of the second mast on the one side, the second traveling motor is arranged protruding from the second traveling unit to one side in a direction intersecting an extending direction of the second mast and the extending direction of the traveling path, and the second lifting motor is arranged protruding from the second traveling unit to the other side in the intersecting the extending direction of the second mast and the extending direction of the traveling path.

13. An operation method for the automated warehouse according to claim 12, comprising:

a first step of disposing the first transferring device and the second transferring device at different positions in the vertical direction; and a second step of, after the first step, disposing the first stacker crane and the second stacker crane so that the first transferring device and the second transferring device face shelves at a same position in the horizontal direction.

14. An operation method for the automated warehouse according to claim 12, comprising:

when the first stacker crane has failed, a first step of disposing the first stacker crane so that the first transferring device faces the shelf at the end on the other side in the travel direction; and a second step of causing the second stacker crane to convey the article.

15. The operation method for an automated warehouse according to claim 14, wherein, in the second step, restraint of the first lifting platform on the first mast is released in the first stacker crane.

* * * * *